United States Patent [19]

Domigan et al.

[11] Patent Number: 4,986,045
[45] Date of Patent: Jan. 22, 1991

[54] CELLULAR RACEWAY

[75] Inventors: Charles N. Domigan, Coolville, Ohio; J. David Harmon, Vienna, W. Va.

[73] Assignee: Butler Manufacturing Co., Kansas City, Mo.

[21] Appl. No.: 379,215

[22] Filed: Jul. 13, 1989

Related U.S. Application Data

[63] Continuation of Ser. No. 216,168, Jul. 7, 1988, abandoned.

[51] Int. Cl.$^5$ .............................................. E04F 17/08
[52] U.S. Cl. ...................................................... 52/221
[58] Field of Search .................... 52/221, 220, 731; 174/48

[56] References Cited

U.S. PATENT DOCUMENTS

| | | | |
|---|---|---|---|
| 3,420,018 | 1/1969 | Fork | 52/221 |
| 3,435,568 | 4/1969 | Hoseason | 52/221 |
| 4,338,484 | 7/1982 | Littrell | 52/221 |
| 4,593,506 | 6/1986 | Hartman | 174/48 |
| 4,593,507 | 6/1986 | Hartman | 174/48 |
| 4,594,826 | 6/1986 | Gray | 52/221 |

Primary Examiner—John E. Murtagh
Attorney, Agent, or Firm—Frederick J. Olsson

[57] ABSTRACT

A cellular raceway constructed of roll formed pieces all welded together including a base member, an upper member, and a barrier. The base member has a center section and outboard sections with ribs respectively connecting the center section to the outboard sections. The upper member has a center section disposed over the base center section, outboard sections respectively disposed over the base outboard sections together with outboard walls extending toward and welded to the base outboard sections. The barrier may comprise angle pieces or a hat-shaped piece. The barrier provides electrical separation for the forming of power and communication cells.

2 Claims, 1 Drawing Sheet

CELLULAR RACEWAY

This invention relates to underfloor or infloor electrical distribution systems for buildings and more particularly the invention relates to improvements in cellular raceways for use in such systems Cellular raceways of the kind in question conventionally have a central power cell for carrying power cable and a pair of communication cells on opposite sides of the power cell. One of the cells carries telephone cable and the other carries computer, data, or other low potential cables.

The cellular raceway herein may be employed for any of the conventional modes in building floors. For example, the unit may be mounted on a concrete slab subfloor and covered with the concrete for the finished floor. In the latter case, the unit functions solely as an electrical raceway. Also, the unit may be employed as one or more of the sections making an all-cellular floor or as one or more sections blended with conventional deck. In the latter two cases, the unit has the structural function of supporting the wet concrete during the pour and thereafter serving as an electrical raceway.

One of the objects of the invention is to provide designs for the cellular raceway components which can be fabricated by roll forming and slitting and arranged so that the capacity of one or more of the cells can be changed simply by change in the lateral dimensions, the latter being effected by changing the lateral position of the rings on the roll set and providing stock of the necessary width.

Another object of the invention is to provide designs for cellular raceway components which can be fabricated by roll forming and slitting and arranged so that the raceway can be made for use on a concrete slab subfloor or made for use in a cellular floor by adding rings to configure edges for blending purposes, slightly modifying an internal barrier, and providing stock of the necessary width.

The invention will be described below in connection with the following drawings wherein.

Figure 1:
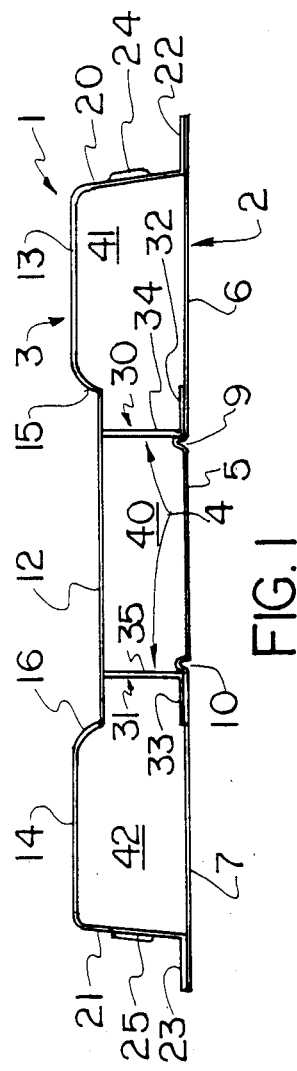
FIG. 1 is an end view of a cellular raceway made in accordance with the invention.

It will be understood that components described herein are formed from sheet metal of appropriate gauge and with a length and width compatible to the particular application. Also, inasmuch as the profile of a unit is relevant to the invention, only the latter and not the length is shown in the drawings.

In FIG. 1, the cellular raceway has a base member 2, and upper member 3 and barrier means 4. Each of the components 2, 3, and 4 are fabricated by roll forming and slitting.

The base member 2 has a flat base center section 5 and first and second flat base outboard sections 6 and 7. The base center section is connected to the base outboard sections 6 and 7 by The upper member 3 has a flat upper center section 12 which is disposed over and spaced from the base center section 5, and first and second flat upper outboard sections 13 and 14. The sections 13 and 14 are disposed over and spaced from the base outboard sections 6 and 7. The upper center section is connected to the upper outboard sections by the semi-circular bends 15 and 16.

The upper member 3 also includes the first and second outboard walls 20 and 21. The walls 20 and 21 have feet 22 and 23 which are welded to the base outboard sections 6 and 7. The outboard walls 20 and 21 have W-shaped concrete locking protrusions 24 and 25. The protrusions are formed during the initial rolling stage.

As will be observed, each of the outboard walls 20 and 21 extends downwardly from the upper outboard section at an obtuse angle of approximately 85°.

In the embodiment of FIG. 1 the barrier means 4 comprises first and second angle members 30 and 31.

The angle members have feet 32 and 33 which respectively engage the ribs 9 and 10 and the base outboard sections 6 and 7. The feet are welded to the outboard sections. The angle members have risers 34 and 35 which extend upwardly and engage the underside of upper center section 12.

For fabrication purposes, the upper member 3, the base member 2, and the angle members 30 and 31 are each rolled into the respective profiles shown and then cut or slit to the appropriate length. Next, the angles 30 and 31 are assembled to the base member 2. This subassembly is then secured to the upper member. The ribs members 9 and 10 are highly desirable for fabrication purposes because they serve as the datums for properly positioning the angle members 30 and 31.

From the foregoing description, it will be evident that cellular raceway 1 includes the center power cell 40 and the outboard communication cells 41 and 42.

Figure 2:
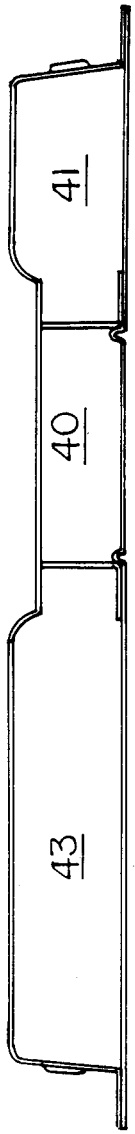
FIG. 2 is an end view similar to FIG. 1 wherein the capacity of one of the communication cells has been enlarged.
Figure 3:
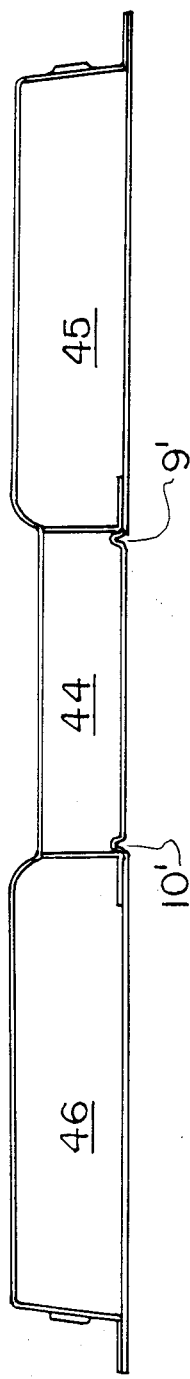
FIG. 3 is an end view similar to FIG. 1 where the capacities of the power and communication cells has been enlarged.

As noted heretofore the capacity of the cells can be easily modified Typical examples are shown in FIGS. 2 and 3.

In the cellular raceway of FIG. 2, the sizes of the cells 40 and 41 are unchanged while the size of the other communication cell is enlarged as indicated for cell 43. Note that the same profile is employed. The foregoing is accomplished as by providing wider stock for the base member and for the upper member and by shifting the lateral positions of the rings for rolling the outboard cell 43.

In the cellular raceway of FIG. 3, the sizes of the power cell 44 and the communication cells 45 and 46 are enlarged. The configuration of FIG. 3 is accomplished by providing stock of the appropriate width and by shifting outwardly the rolls which form parts of the raceway of FIG. 1. Note that the ribs 9' and 10' are farther apart than the corresponding ribs 9 and 10.

Figure 4:
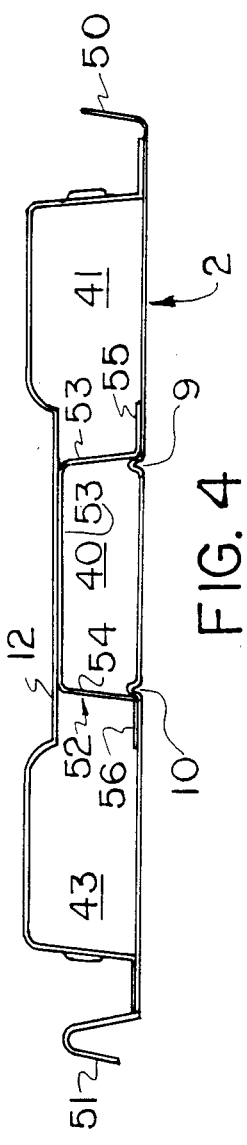
FIG. 4 is an end view of a cellular raceway arranged for use as a section of metal cellular floor.

The profile of the raceway described in FIG. 1 is easily arranged so that the raceway can be employed in a metal cellular floor. Thus, in FIG. 4 the upper member 3 is unchanged. The base member 2 is the same except it has been provided with the standing-seam edges 50 and 51 for blending purposes. The barrier means 4 has been modified by that the two independent angle members 30 and 31 have been replaced by a single, continuous hat-shaped section 52. The hat-shaped section 52 has a top 53 engaging the underside of the upper center section 12, first and second side walls 53 and 54 which extend down and engage with the ribs 9 and 10. The hat section has feet 55 and 56 which are welded to the base.

It will be understood that the upper center section and upper outboard sections of the respective raceways described above are provided with access openings and that the raceway is adapted to mount a preset over these openings to receive the various power and communication cables for transfer to a work station served by the preset.

While we have used the term power cell and communication cells in the foregoing description, it will be understood that the trade sometimes designates these cells as being high tension and low tension.

We claim:

1. In a cellular raceway constructed of roll formed pieces all welded together including a base member, an upper member, and barrier means.

the base member comprising:
   a flat base center section;
   first and second flat base outboard sections:
   the base center section and the first and second base outboard sections respectively lying in a plane;
   first and second ribs respectively connecting the base center section to the first and second outboard sections, each rib being in the form of a reverse bend;
the upper member comprising:
   an upper center section disposed over and spaced from said plane containing said base center section;
   first and second flat, coplanar upper outboard sections respectively disposed over and spaced from said plane containing said first and second base outboard sections;
   the first and second upper outboard sections being spaced from said plane a greater distance than said upper center section;
   first and second outboard walls connected respectively to said first and second upper outboard sections and extending toward and connected respectively to said flat base outboard sections, the connections being by welding;
   each said outboard wall closing off the space between the upper outboard section to which it is connected and the base outboard section to which it is connected;
   the extension of said outboard walls each being at an obtuse angle with respect to its upper outboard section;
said barrier means comprising a first and second spaced apart, disconnected angle members comprising:
   the first angle member a foot section closely adjacent to said first rib and welded to said first base outboard section and a riser extending toward and engaging said upper center section; and
   the second angle member having a foot section closely adjacent to said second rib and welded to said second base outboard section and a riser extending toward and engaging said upper center section.

2. In a cellular raceway constructed of roll formed pieces all welded together including a base member, an upper member, and barrier means;

the base member comprising:
   a flat base center section;
   first and second flat base outboard sections;
   the base center section and the first and second base outboard sections respectively lying in a plane;
   first and second ribs respectively connecting the base center section to the first and second outboard sections with each rib being in the form of reverse bend;
the member comprising:
   an upper center section disposed over and spaced from said plane continuing said base center section;
   first and second flat, coplanar upper outboard sections respectively disposed over and spaced from said plane containing said first and second base outboard sections;
   the first and second upper outboard sections being spaced from said plane a greater distance than said upper center section;
   first and second outboard walls connected respectively to said first and second upper outboard sections and extending toward and connected respectively to said flat base outboard sections, the connections being by welding;
   each said outboard wall closing off the space between the upper outboard section to which it is connected and the base outboard section to which it is connected;
said barrier means comprising a hat-shaped member having:
   a top wall disposed on the underside of and engaging said upper center section and being welded thereto; and
   first and second side walls each having a foot section, the side walls being connected to said top wall and extending toward said base member and the foot sections respectively being closely adjacent said first and second ribs and respectively being welded to said base outboard sections.

* * * * *